(118.)

HENRY H. LOCKE.

Pump-rod Attachment.

No. 4,682. Reissued Dec. 26, 1871.

Witnesses.
R. F. Osgood.
Archie Baine

Inventor.
Henry H. Locke
By Douglas Bly
atty.

AM. PHOTO-LITHOGRAPHIC CO. N.Y. (OSBORNE'S PROCESS.)

UNITED STATES PATENT OFFICE.

HENRY H. LOCKE, OF PLEASANTVILLE, PENNSYLVANIA, ASSIGNOR TO DOUGLAS BLY, OF ROCHESTER, NEW YORK.

IMPROVEMENT IN PUMP-ROD ATTACHMENTS.

Specification forming part of Letters Patent No. 103,632, dated May 31, 1870; reissue No. 4,682, dated December 26, 1871.

Specification describing a certain Improvement in Pump-Rod Attachments, invented by HENRY H. LOCKE, of Pleasantville, in the county of Venango and State of Pennsylvania.

This invention consists of an attachment for a pump-rod, whereby the same may be adjusted in place and readily clamped in position, as hereinafter described.

Figure 1:
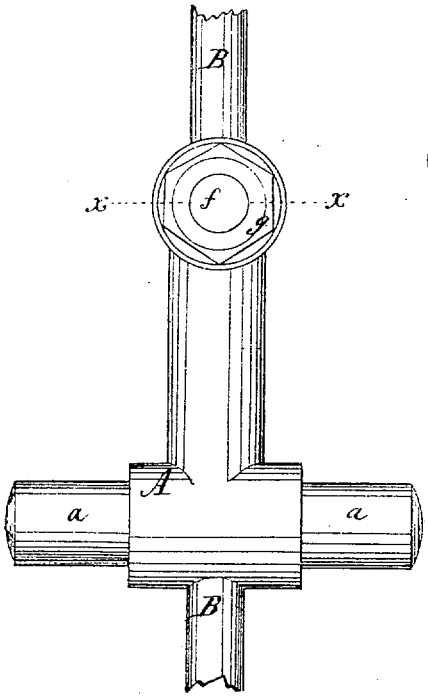
Figure 2:
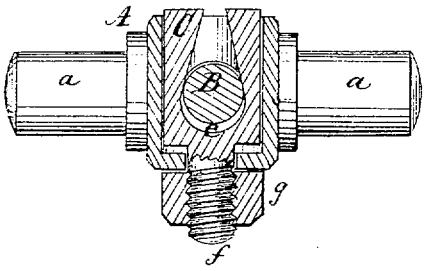
Figure 3:
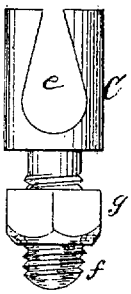

In the drawing, Figure 1 is an elevation of my improved attachment, with a pump-rod connected therewith; Fig. 2, a horizontal section in line *x x;* Fig. 3, a plan of the clamping-bolt, detached.

A represents the cross-head or bearing-block, which has an axis, *a*, that rests in the end of the working beam and forms the joint to allow the necessary oscillation at different points of the stroke. A socket is formed in the cross-head to receive the pump-rod B, which may be adjusted up and down therein, being held at different positions by the clamping-bolt, hereinafter described. The cross-head is also formed with a socket at right angles to the rod, having a shoulder or stop, and in this socket fits the clamping-bolt C. This bolt is formed with an opening or passage, *e*, of sufficient size to receive the rod B, and allow its ready adjustment up or down. The bolt is provided with a screw-shank, *f*, which extends through the cross-head and has a nut, *g*, screwing upon its end, by which it is tightened in place.

The bolt C being inserted in its place, as shown in Fig. 2, the pump-rod B is passed through its opening, when, by tightening it up, the rod is clamped or griped and held firmly in place between the bolt and the cross-head. The rod may be readily slipped up or down by simply loosening the bolt, and may be held at any desired point by tightening up again.

This arrangement is particularly adapted to deep-well pumps, which require a nice adjustment of the rod to adapt the piston to proper action with the valves.

What I claim, and desire to secure by Letters Patent, is—

The combination of the clamping-bolt C with the cross-head A, for the purpose of allowing the adjustment and producing the clamping of a pump-rod, as specified.

HENRY H. LOCKE.

Witnesses:
M. C. BENEDICT,
G. W. UNDERWOOD.

(118)